United States Patent [19]
Laundry et al.

[11] 3,787,848
[45] Jan. 22, 1974

[54] SYSTEM FOR DISCRIMINATING BETWEEN HIGH AND LOW SPEED TARGETS
[75] Inventors: Terrence H. Laundry, Culver City; Richard L. Luther, Thousand Oaks; John S. Murray, Jr., Orinda, all of Calif.
[73] Assignee: Hughes Aircraft Company, Culver City, Calif.
[22] Filed: Aug. 28, 1972
[21] Appl. No.: 285,284

[52] U.S. Cl. .............. 343/7.7, 343/5 DP, 343/7 A, 343/17.1 PF
[51] Int. Cl. ............................................. G01s 9/42
[58] Field of Search..... 343/5 DP, 7 A, 7.7, 17.1 PF

[56] References Cited
UNITED STATES PATENTS
3,727,224  4/1973  Webb................................... 343/7.7

Primary Examiner—T. H. Tubbesing
Attorney, Agent, or Firm—W. H. MacAllister; Lawrence J. Link, Jr.

[57] ABSTRACT

The disclosed system distinguishes between high and low speed targets by the resolution of frequency ambiguities in return signals from a repetition rate coded transmitted radar signal. The return signals are processed through a passband filter; and logic circuits, which monitor the filter's output, provide an indication of the speed range of the targets as a function of the presence or absence of modulation resulting from the repetition rate coding.

16 Claims, 12 Drawing Figures

PATENTED JAN 22 1974 3,787,848

SYSTEM FOR DISCRIMINATING BETWEEN HIGH AND LOW SPEED TARGETS

The invention claimed herein was made in the course of or under a contract with the Department of the Air Force.

BACKGROUND OF THE INVENTION

This invention relates to moving target detection systems; and more particularly to systems for distinguishing between high and low speed targets by means of frequency ambiguity resolution.

Discrimination between stationary and moving targets as a function of the doppler frequency shifts of the signals received from moving targets is well known in the art. However, in many applications additional target differentiation, such as between surface and airborne moving targets, is required. For example, in such applications, it may be required that only airborne targets be displayed and returns originating from surface vehicles or vessels be rejected. Rejection of signals from targets moving on the earth's surface may be implemented by selecting the pulse repetition frequency (PRF) of the system sufficiently high and mechanizing the clutter rejection filters so that returns from all but the fastest moving surface targets are eliminated by the rejection band of the clutter rejection filter, i.e., the system's PRF is selected high enough to avoid frequency ambiguity in the target signals. However, such high PRF systems have certain disadvantages, such as a reduction in the system's unambiguous range; and for "coherent on receive" type systems, problems resulting from the noncoherency of "multiple time around" returns increase with an increase in the system's PRF.

Hence, a system for discriminating between targets as a function of whether their speeds are above or below a preselected value, and which is adaptable for operation at relatively low PRFs, e.g., less than 6 KHz, would be a significant advance in the art.

SUMMARY OF THE INVENTION

It is therefore an object of the subject invention to provide an improved moving target detection system adapted for distinguishing between moving targets as a function of their relative speeds.

It is another object to provide a moving target detection system having a relatively large unambiguous range, and which is capable of distinguishing between surface and airborne moving targets.

A further object is to provide a cost effective signal processor capable of identifying targets moving at speeds above a preselected value.

Another object is to provide a moving target signal processor which inhibits the display of surface traffic targets.

Still another object is to provide a moving target indicator system which allows the discrimination between targets traveling at different speed ranges by resolving frequency ambiguities in the return signals in a low or medium PRF radar system.

In accordance with one preferred embodiment of the subject invention, energy is transmitted in groups of pulses such that different groups have different pulse repetition frequencies (PRF). The return energy is processed by a filter circuit programmed such that signals derived from objects moving at speeds within a first speed range result in output signals having substantially the same amplitude during the different PRF modes, and objects moving at speeds within a second speed range result in output signals having detectably different amplitude values during the different PRF modes. Logic circuits which monitor the filter output, sense the presence or absence of modulation induced by PRF variations, and provide signals indicative of the speed range of the targets as a function thereof.

BRIEF DESCRIPTION OF THE DRAWINGS

The novel features of this invention, as well as the invention itself, will be best understood from the accompanying description taken in connection with the accompanying drawings in which like reference characters refer to like parts and in which.

DESCRIPTION OF THE PREFERRED EMBODIMENT

Figure 1:
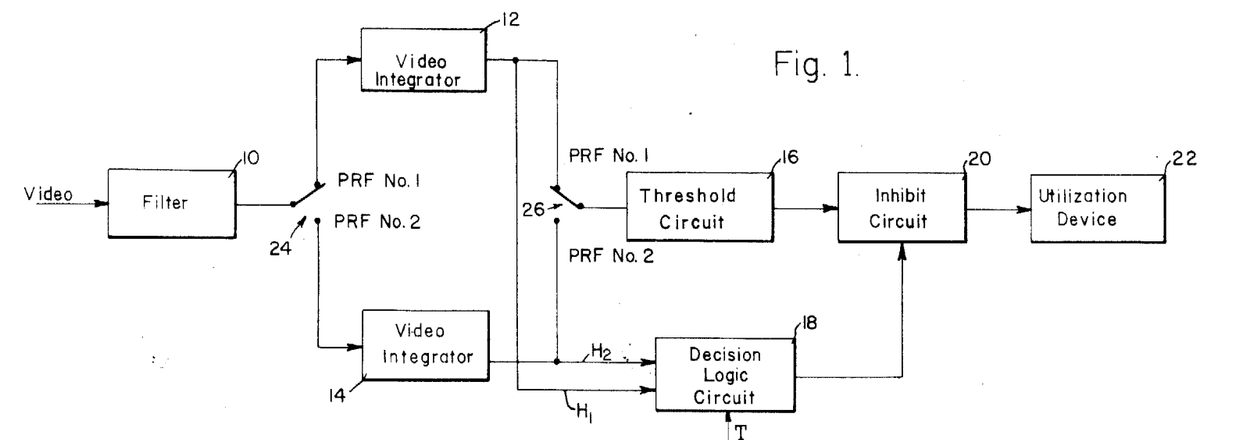
FIG. 1 is a functional block diagram of a moving target processor in accordance with the invention.

Referring first to FIG. 1, received signals from a suitable energy transmission and reception system (see FIG. 7) are applied to a filter 10, which according to one preferred embodiment is a programmable passband filter. The filter 10 processes return signals for each of a plurality of range bins for N transmission periods, and then provides an output signal for each range bit. These output signals from filter 10 are further processed by video integrators 12 and 14 and a threshold circuit 16. If the threshold level of circuit 16 is exceeded, and if the target's speed exceeds a preselected value as determined by a decision logic circuit 18, the target signal is applied through an inhibit circuit 20 to a utilization device 22.

On alternate signal formation periods of filter 10, the energy transmission and reception system is controlled such that the pulse repetition rate of the transmitted energy is switched between different PRF values, which may be separated by 10 percent or more, for example, with the lowest PRF being greater than twice the doppler frequency shift of the fastest surface target to be rejected. For example, in an X band radar system during a first PRF mode the transmitter's pulse repetition rate could be 4.0 KHz and during a second PRF mode the repetition rate could be 4.5 KHz. The transfer characteristics of filter 10 are programmed during the different PRF modes such that its gain versus frequency characteristics for signals having a doppler frequency less than a PRF/2 (lower PRF) is the same in both PRF modes, but the filter's output, for a given range bin, will be different in the two PRF modes for higher speed targets. Hence, the output signal from filter 10 for low speed target signals is substantially invariant to PRF change, while the amplitude of high speed target signals will alternate as a function of the PRF mode.

Video integrator 12 accumulates, with a preselected time constant, the output signals for each of the respective range bins during PRF mode number 1; and video integrator 14 performs a corresponding function during PRF mode number 2. The switching of the input and output signals of integrators 12 and 14 is implemented by switches 24 and 26; and although mechanical switches are shown for clarity of illustration, it will be understood that electronic switches would preferably be used.

Logic circuit 18 compares the output signal from the video integrators on a range bin by range bin basis, and if a substantial difference in the output signals for a given range bin is detected, inhibit circuit 20 is controlled such that an output signal from threshold circuit 16 is passed to utilization device 22.

Figure 2A:
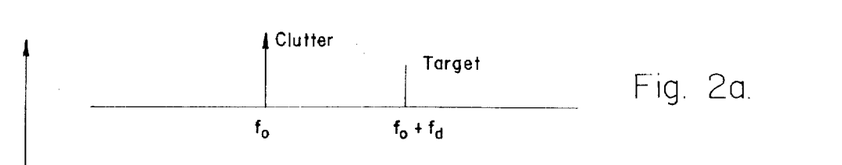
FIGS. 2a, 2b and 2c are spectral diagrams of received radar signals, useful for explaining the operation of the invention.
Figure 2B:
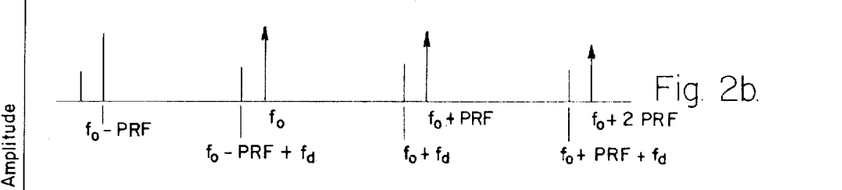
Figure 2C:
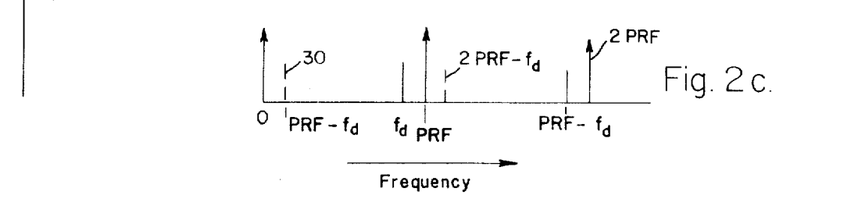

The principles of operation of the subject invention may be better understood after first referring to the signal spectra of FIGS. 2a and 2b. FIG. 2a shows the spectrum of the received signal from a continuous wave radar as consisting of a large signal at the frequency of the transmitted signal ($f_o$), which signal corresponds to returns from stationary objects such as ground clutter; and a smaller moving target signal separated from the clutter frequency by the doppler shift $f_d$. In FIGS. 2a–2c the portion of the signal spectrum derived from stationary objects is designated by an arrow, while the smaller vertical line indicates signals derived from moving targets. FIG. 2b illustrates the same received spectrum as FIG. 2a, but for a pulsed radar system. For the situation of FIG. 2b, the clutter and moving target signal spectrum each consist of a series of spectral lines separated by a PRF interval with the same relative frequency separation as in the continuous wave case of FIG. 2a.

Figure 3:
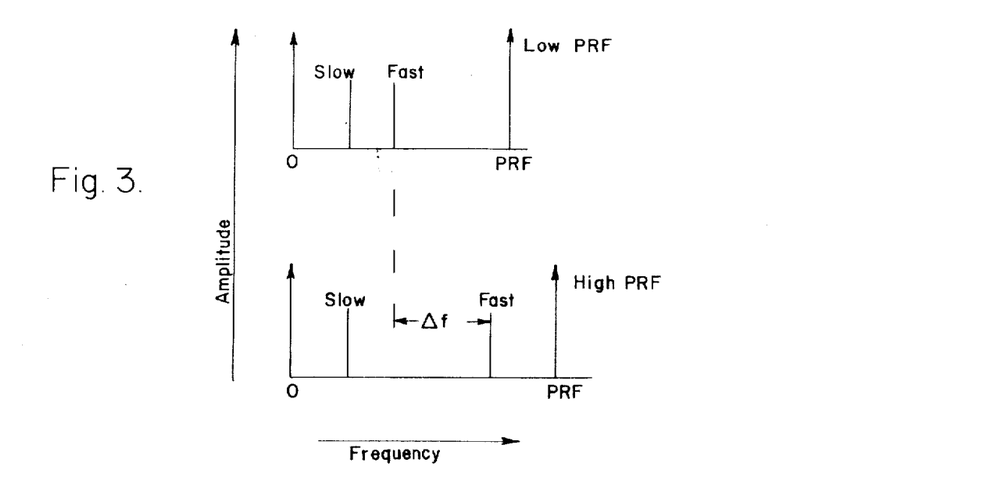
FIGS. 3 and 4 illustrate target signal spectra resulting from transmissions at different pulse repetition frequencies.

FIG. 3 shows the signal spectra for one PRF interval of a closing slow speed and a closing high speed target, for the low PRF and high PRF modes. As there shown, a slow speed moving target, for example a surface moving target, whose doppler frequency is less than a PRF, is doppler insensitive to changes in the PRF. By way of contrast, high speed targets are strongly PRF sensitive and the frequency interval Δf as shown in FIG. 3 is equal to the amount of frequency change between the two PRFs times the number of spectral clutter lines (PRF intervals) of the high speed target's true doppler frequency shift.

Figure 4:
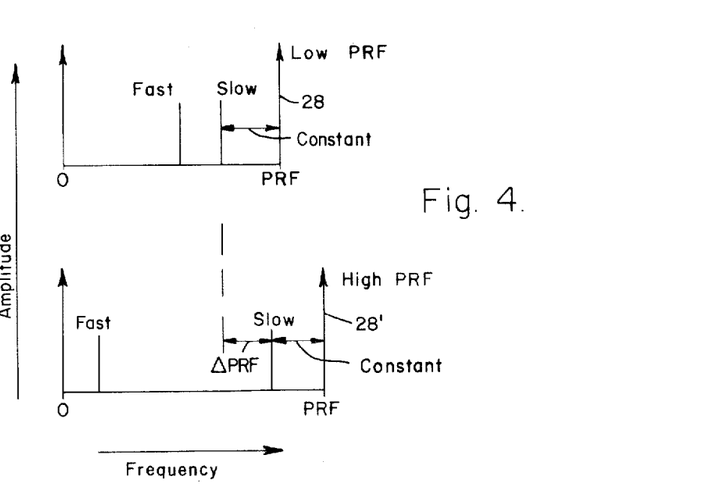

FIG. 4 shows the signal spectra for one PRF interval for an opening slow speed target and an opening high speed target, for the low and high PRF modes; and as there shown, the opening slow speed target appears invariant with PRF when the frequency origin is considered at PRF spectral lines 28 and 28'; i.e., the frequency interval between the slow speed opening target and its associated PRF (clutter) line is constant.

Figure 5:
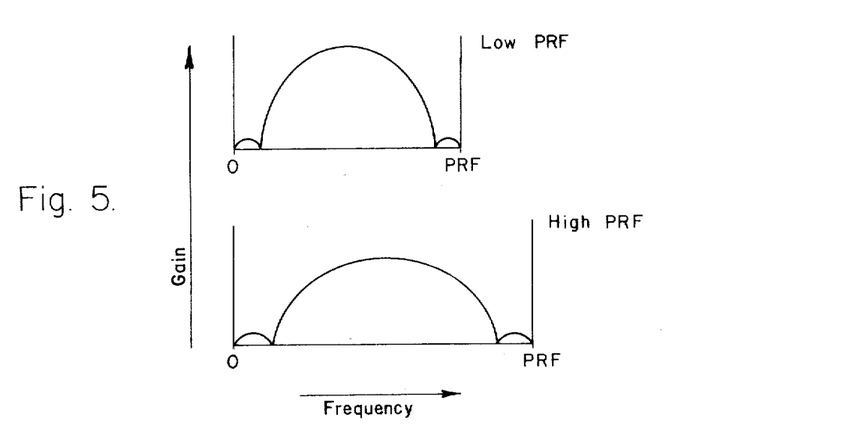
FIG. 5 illustrates the response to signals of different pulse repetition frequencies, of a conventional MTI filter.

FIG. 5 shows the transfer characteristics of an unmodified (conventional) MTI filter for the low and high PRF modes, and it is noted that the filter response in terms of absolute frequency varies between the two PRF modes.

Figure 6:
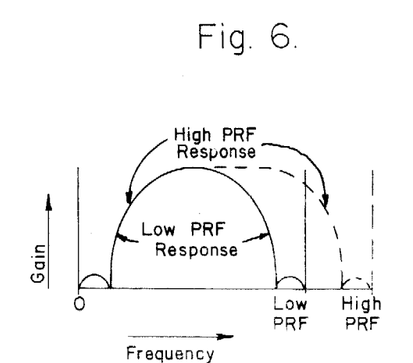
FIG. 6 depicts the transfer characteristics of a clutter rejection filter programmed in accordance with the subject invention.

In accordance with one embodiment of the subject invention filter 10 is programmed during the respective PRF modes so that the response of the filter is PRF invariant for signals derived from targets having a doppler frequency of less than a PRF/2 (see FIG. 6). This requires the response of filter 10 to be substantially the same in the two PRF modes over the frequency interval from DC to a PRF/2; and that the response of the filter 10 be shifted by an amount equal to the frequency difference between the two PRFs (ΔPRF), see FIG. 4, for the frequency range from PRF/2 to PRF. To phrase this last point in slightly different terminology, the filter response for the frequency interval from PRF/2 to PRF is the same for frequencies equidistant from the PRF (clutter) line — i.e., considering the PRF (clutter) line as the origin, the response of the filter is invariant over the interval from the PRF to the PRF/2.

In the interest of clarity of the explanation, a phenomenon known as "spectrum folding" was ignored in the above discussion. However, it should be noted that when the RF spectrum of FIG. 2b is translated in frequency such that the central clutter spectral line ($f_o$) is transposed to zero frequency (DC), the resulting spectrum is as if the RF spectrum had been folded about the $f_o$ frequency (see FIG. 2c). This folding produces an additional spectral line for each moving target as indicated by line 30 of FIG. 2c. However, as shown in FIG. 2c, the pair of spectral lines associated with each moving target are symmetrically disposed about the PRF/2 point; and in accordance with the characteristics of filter 10 explained relative to FIG. 6, video ("folded") target signals resulting from targets having speeds which produce a doppler shift less than the PRF/2 will be processed through filter 10 in such a manner that the output target signals are substantially PRF invariant.

Referring again primarily to FIG. 1, video integrators 12 and 14 form the time weighted integral of the output signals for each range bin during PRF modes 1 and 2, respectively. If the output signal from integrator 12 is designated as $H_1$ and the output signal from integrator 14 as $H_2$ then the decision logic circuit 18 forms, for example, the computation whereby: if $$|H_1 - H_2| > T \times |H_1 + H_2| \qquad (1)$$

an inhibit signal is not generated;
but if $$|H_1 - H_2| \leq T \times |H_1 + H_2| \qquad (2)$$

an inhibit signal is produced.

The symbol T in equations (1) and (2) stands for the threshold level signal applied to logic unit 18 and this signal may be adjustable by the system's operator. It is noted that the product of the terms T, and $|H_1 + H_2|$ is used to normalize the response of circuit 18 with respect to target signal amplitude. If in addition to speed, other characteristic differences between targets are to be discriminated, then provisions therefor may be included in decision logic circuit 18. For example, if relative small aircraft or missiles are to be discriminated from large surface moving targets such as ships, then a discrimination function which enhances detection of small targets, with large Δf values (see FIG. 3) between PRF modes, and which rejects large targets, with small Δf values between PRF modes should be implemented. One such suitable detection function would only require multiplying the right hand sides of equations (1) and (2) by the larger of the terms $|H_1|$ or $|H_2|$. This would enhance the probability or selection of small high speed targets and the rejection of large low speed targets.

Figure 7:
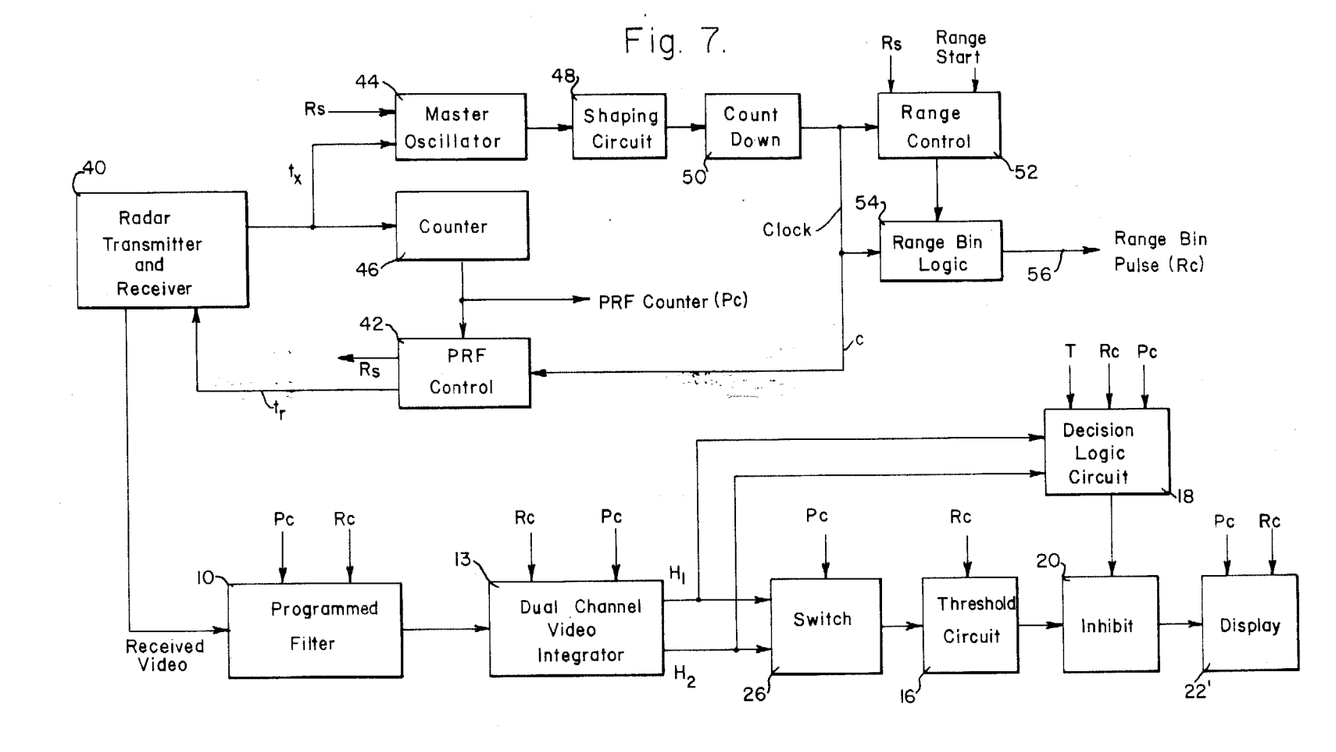
FIG. 7 is a block diagram of a radar system incorporating the moving target processor of FIG. 1.

Reference is now directed primarily to FIG. 7 which shows in block diagram form, a system incorporating the moving target processor of FIG. 1. As shown in FIG. 7, a radar transmitter and receiver subassembly 40 is synchronized by a $t_r$ trigger pulse applied thereto from a PRF control unit 42. In response to each $t_r$ trigger pulse, subassembly 40 transmits an energy pulse, and a portion of this RF pulse is detected and applied as a video trigger pulse ($t_x$) to a master oscillator 44 and a counter unit 46. Master oscillator 44, which may be 32 MHz triggered oscillator, is started oscillating by the $t_x$ pulse so as to insure that the relative jitter between the transmitted pulses and the processor clock is maintained below a preselected value, such as 1 nanosecond, for example. The output signals from oscillator 44 are shaped within a shaping circuit 48; reduced in frequency by countdown circuit 50; and applied as clock pulses (c) which may be, for example, at a 2 MHz rate. The clock pulses are applied to a range gate control unit 52 and to a range bin logic circuit 54. Control unit 52 responds to a range start signal, applied from subassembly 40, which may be operator selectable, to determine at what range the video processor will start processing received radar signals. After range gate control unit 52 has counted clock pulses for an interval indicative of the start range, an output signal is applied to enable the range bin logic circuit 54 which applies clock pulses to its output lead 56 for the time interval between the start of the active ranging period until a predetermined number of range intervals has occurred, for example, 400 range intervals or bins. The output signals from range bin logic circuit 54 are designated range bin pulses ($R_c$). Implementations for range gate control unit 52 and range bin logic circuit 54 are well known to those skilled in the art and hence these circuits are not shown in greater detail. For example, control unit 52 may consist of counters and logic circuits which provide an output pulse (range gate pulse) upon a number of clock pulses being applied thereto equal to a digital range start value, and this output pulse is continuous in duration until a second count, for example 400 pulses later, has been reached. The range gate signal from unit 52 could then be utilized in circuit 54 as one input to an AND gate (not shown), with the clock pulses (c) being applied to the other AND gate input terminal, and the range bin pulses ($R_c$) would be produced at the output of the AND gate.

Counter 46 counts up to 2 N pulses and then automatically resets, where N is the number of pulses used to form each output signal from filter 10. For example, if 10 pulses are used to provide each output of filter 10, then counter 46 would be implemented to count to 20 and then reset. Output signals ($P_c$) from counter 46 are applied to the PRF control unit 42 and are processed therein to determine whether the counter 46 is on counts 1 through 10 or 11 through 20. Counts 1 through 10 are associated with the first PRF mode and counts 11 through 20 with the second PRF mode. Dependent on the PRF mode, the PRF control unit 42 counts clock pulses until the number of pulses indicative of the proper interpulse period for the given PRF have occurred, at which time it provides a reset pulse ($R_s$) to master oscillator 44 and range gate control unit 52. Also at the end of the interpulse interval PRF control unit 42 applies a transmission trigger $t_r$ to radar transmitter and receivers subsystem 40. The reset pulse ($R_s$) applied to master oscillator 44 disenables the oscillator and it remains disabled for a very short period of time until the detected RF trigger $t_x$ is applied from subassembly 40.

During initial system activation, or in the event a transient condition should cause a turn-on trigger ($t_r$) to the master oscillator 44 to be missed, a condition would occur in which the system would be inoperative. To avoid this situation, a slow, for example, 100 Hz, free running oscillator (not shown) is incorporated into PRF control unit 42 for generating a transmitter trigger ($t_r$) at a rate of approximately 100 Hz. This free running oscillator ensures that the transmitter fires to start the chain of events which includes triggering the master oscillator 44. The reset pulse ($R_s$), normally produced by PRF control 42, is utilized to inhibit the operation of the 100 Hz oscillator so as to prevent the random generation of a transmitter trigger if the normal system timing sequence is in progress.

The received radar signals are processed within radar transmitter and receiver subassembly 40 such that the central clutter spectral line (at frequency $f_0$) is translated to zero frequency (DC) as illustrated in FIG. 2c. For airborne applications this just described spectral translation could require the use of motion compensation circuits to compensate for the doppler shift of the spectrum due to the motion of the aircraft relative to the ground. Such motion compensation circuits and techniques for their implementation are well known in the art. An alternative to coherent "motion compensation detection" is envelope-detection MTI processing which is also well known in the art.

The received radar signals are further processed within subassembly 40 by an analog-to-digital converter unit (not shown) which samples the received signals at a preselected rate, such as 2 Mhz, and converts each sample to a 9 bit, for example, binary digital number. The output signals from the analog-to-digital converter would thus be a stream of binary numbers representing the amplitude of the received signals for each range bin. These numbers are supplied to clutter reject filter 10.

Figure 8:
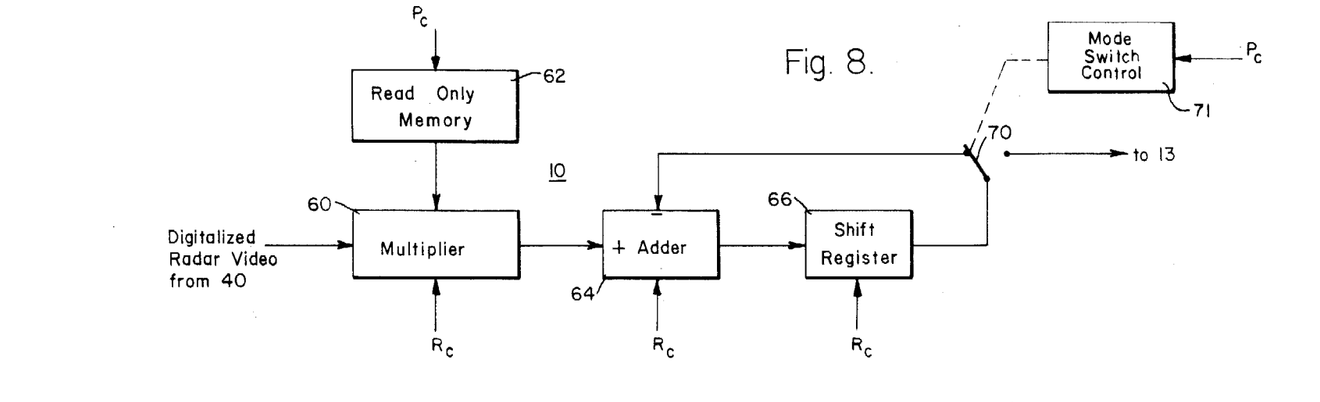
FIGS. 8, 9 and 10 are block diagrams of a programmed filter, a dual channel video integrator and a decision logic circuit, respectively, suitable for incorporation into the system of FIG. 7.

One preferred embodiment of programmed filter 10 is shown in block diagram form in FIG. 8 to which reference is now primarily directed. Each of the digitized received video numbers from radar subassembly 40 is multiplied within a multiplier unit 60 by a selected prestored weighting factor applied from a read only memory unit 62. The product term from multiplier 60 is subtracted in an adder circuit 64 from the output value of a shift register 66. In the embodiment of FIG. 8, shift register 66 would be 400 stages long and 12 bits wide, for example. During the formation of an output signal within filter 10, the output signals from shift register 66 are applied to adder 64 through a switch 70. Switch 70 is controlled by means of a mode switch control unit 71, such that on the last processing sequence of each output formation, the recirculation loop is opened by means of switch 70 and the contents of the shift register are read out to dual channel video integrator 13 (FIG. 7). For example, if the formation period of filter 10 is 10 transmission periods, then read only memory 62 provides the proper weighting values to produce the desired filter response (see FIG. 6) in each of the PRF modes. Read only memory 62 is controlled in response to the $P_c$ signals which are indicative of the PRF interval of the system. Hence, for the disclosed embodiment memory 62 would store 20 weighting coefficients — one for each of PRF interval in the 20 PRF sequence, i.e., 10 weighting function values for PRF mode number one and 10 weighting function values for PRF mode number two. Techniques for computing the weighting functions required so that digital filter 10 provides a given frequency response are well known in the art; such as the techniques disclosed in section 35 of the Radar Handbook (1970), by Merrill I. Skolnik, published by the McGraw Hill Book Company.

Figure 9:
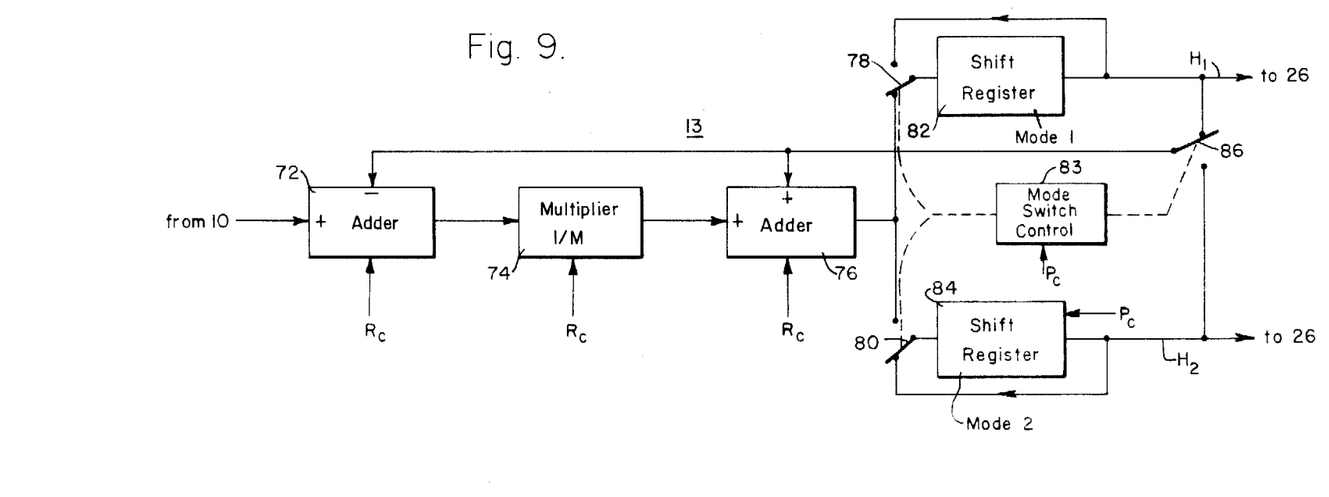
Figure 10:
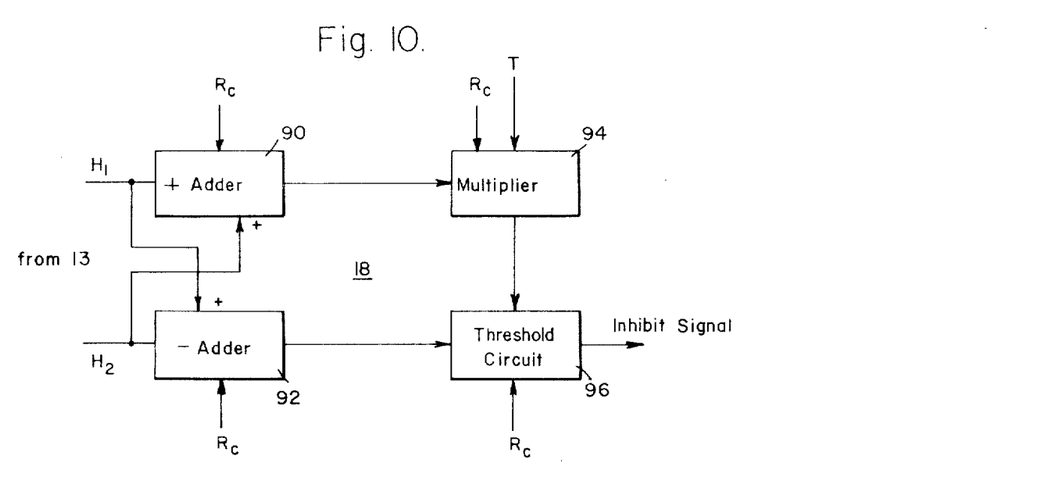

The detailed timing and control circuits for the units of FIGS. 8, 9 and 10 are well known to those skilled in the art and hence in order to maintain the clarity of the description are not presented herein. However, it will be apparent that the total delay for these units is made effectively equal to the radar's interpulse interval by the timing and control functions, even though the active length of the storage portion of these units is only a fraction of that period. This is accomplished by synchronizing the operation of these units with the range bin pulses ($R_c$) applied from unit 54 of FIG. 7. In a similar manner switches in unit 13 and switch 26 are controlled by the PRF count signals ($P_c$) such that proper signal routing is obtained during the respective PRF modes.

One preferred embodiment for dual channel video integrator 13 is shown in FIG. 9 wherein output signals from filter 10, during each of the PRF modes, are separately integrated. Functionally, the video integrator associated with each of the PRF modes accumulates the corresponding filter output signals over a time period equal to the time the radar antenna scans across the target (a time on target period). The video integrator implementation of FIG. 9 comprises two 400 stage 12 bit wide, for example, shift registers 82 and 84, associated with PRF modes 1 and 2, respectively. The digital output signals from filter 10 are applied to an adder 72 wherein they are subtracted from the output signals of the selected shift register 82 or 84. In the mechanization shown in FIG. 9, switches 78, 80 and 86, which are controlled by a mode switch control unit 83, are illustrated for PRF mode number one; and for this case the output signals from shift register 82 are recirculated to adders 72 and 76. It is noted that by using the dual channel video integrator configuration of FIG. 9, that switch 24 of FIG. 1 may be eliminated and the output of filter 10 applied to the input of the unit of FIG. 9. In this configuration, the switching functions of switch 24 are preformed by switches within the device of FIG. 9.

Referring again primarily to FIG. 9, in adder 72 the recirculated signal is subtracted from the input signal from filter 10, and the output from adder 72 is multiplied in multiplier unit 74 by a preselected constant which may be selected as equal to a value of 1/M where M is the exponential weighting function of the integrators, i.e., it determines the integration time constant and may be set equal to a time on target, such as eight filter read out periods, for example. The output signals from multiplier 74 are summed in adder 76 on a range bin by range bin basis with the output signals applied to the recirculation loop and the summed term then applied to shift register 82. During the PRF one mode of operation, shift register 82 performs an integration of the output signals from filter 10 on a range bin by range bin basis, and shift register 84 is coupled in a recirculation configuration. Therefore the unit of FIG. 9 provides two output signals for each of the respective range bins during each active integration period, i.e., during the time period that the output signals are read out of filter 10, e.g., every 10th PRF period for the disclosed embodiment. It is noted that since shift registers 82 and 84 are updated on alternate filter formations that the computations performed by decision logic circuit 18 (FIG. 7) may be made on a range bin by range bin basis during each integration processing interval. It is also noted that since such comparisons are made during each filter formation, e.g., every 10th interpulse period, slowly varying target modulation such as caused by "chirp" or antenna gain changes do not significantly effect the operation of the invention. Antenna gain changes with respect to a given target, could be produced by relative motion between the antenna beam pattern and the target, for example.

The $H_1$ and $H_2$ output signals from the integrator unit of FIG. 9 are applied to decision logic circuit 18 which is shown in greater detail in FIG. 10. Referring momentarily to FIG. 10, adder 90 forms the term $|H_1 + H_2|$ and adder 92 forms the term $|H_1 - H_2|$. The output signal from adder 90, on a range bin by range bin basis, is applied to a multiplier 94 wherein it is multiplied by the threshold signal T; and the product term therefrom is compared in a threshold circuit 96 to the term $|H_1 - H_2|$ applied to the threshold circuit from adder 92. If $|H_1 - H_2| > T \times |H_1 + H_2|$ then an inhibit signal is not generated and the output signal from the integrator unit of FIG. 9 is applied through switch 26 (FIG. 7), threshold circuit 16 and inhibit circuit 20 to the display unit 22'. Thus if the signals read out of the integrator of FIG. 9 on a range bin by range bin basis, exceed the threshold level of unit 16 and if logic circuit 18 senses "PRF coding" induced modulation sufficient to indicate that the target's speed is in excess of the preselected value, then the inhibit circuit 20 is programmed to allow the target signal to be applied to display unit 22'.

Although a selected preferred embodiment of the invention has been described herein with particularity, it is understood that many changes or modification thereto may be made without departing from the scope of the subject invention. For example, filter 10 need not be programmed in applications where the resulting decrease in discrimination sensitivity is acceptable. Similarly, it may be desirable in less sophisticated systems to provide a simpler implementation of decision logic circuit 18. One such mechanization of circuit 18 could include applying the $H_1$ and $H_2$ signals to respective threshold circuits, and for low speed target rejection applications, the output signals from these threshold circuits are applied to the inputs of an AND gate, with the AND gate output being applied to circuit 20 as an inhibit signal. For high speed target rejection, a NAND gate would be used in place of the AND gate in the just described circuit.

It is further noted that while the disclosed embodiment is a digital implementation in which a plurality of range bins are monitored by delay means (shift registers) which store the data for each of the range bins between PRF intervals, that such a sequential system could be implemented by analog rather than digital means. Also a parallel implementation could be mechanized whereby received data from each range bin is range gated and applied to dual banks of filters with each filter being associated with a respective range bin and PRF mode.

Thus there has been described a new and useful moving target detector system which has a large unambiguous range and which is capable of determining whether targets are traveling at speeds above or below a preselected value.

What is claimed is:

1. In a system adapted for alternately transmitting groups of energy pulses having first and second pulse repetition frequencies, during first and second pulse repetition frequency modes, respectively; and for receiving returned energy reflected from objects and providing received signals indicative of said returned energy, a moving target processor comprising:
    filter means, responsive to said received signals, and programmed to have a first preselected response characteristic during said first modes, and a second preselected response characteristic during said second modes, such that its response is substantially the same during both modes for received signals from objects moving at a speed less than a preselected value, and its response to received signals from objects moving at speeds greater than said preselected value varies between said modes; and means for monitoring the output signals from said filter means and for sensing variations in the output signals for the same objects between said modes; whereby the presence of said variations is indicative of an object moving at a speed greater than said preselected value.

2. The processor of claim 1 wherein said means for monitoring includes means for integrating said output signals, for each of said objects, produced during said first modes and for providing first integrated output signals indicative thereof; means for integrating the output signals, for each of said objects, produced during said second modes and for producing second integrated output signals indicative thereof; and means for sensing variations in said first and second integrated output signals for each of said objects.

3. The processor of claim 2 wherein said means for monitoring further includes means for providing a target signal if said sensed variations exceed a threshold level.

4. The processor of claim 3 wherein said means for monitoring further comprises means for adapting said threshold level as a function of said integrated output signals.

5. A moving target detector system comprising:
    means for transmitting groups of energy pulses such that different groups have different pulse repetition rates;
    means for receiving energy reflected from said objects and for producing received signals indicative thereof;
    filter means for producing output signals, in response to received signals from objects moving slower than a preselected speed, which are substantially invariant to pulse repetition rate changes; and for producing output signals, in response to received signals from objects moving faster than said preselected speed, which vary with changes in the pulse repetition rate; and
    means for monitoring said output signals and for sensing variations in output signals for the same object, derived from energy pulse groups have different pulse repetition rates; whereby the presence of said variations is indicative of an object moving at a speed greater than said preselected speed.

6. The system of claim 5 wherein said means for monitoring includes means for integrating the output signals for the same object, derived from successive energy groups with the same pulse repetition rate; and means for sensing variations in the integrated output signals, for the same object, formed during the different pulse repetition rate periods.

7. The system of claim 6 wherein said means for monitoring further includes means for providing a target signal if the variations in said integrated output signals exceeds a threshold level.

8. The system of claim 7 wherein said means for monitoring further comprises means for adapting said threshold level as a function of the integrated output signals.

9. The system of claim 5 wherein said filter means includes a programmable filter; and programming means, synchronized with said transmitting means, for programming said filter to have different preselected response characteristics during intervals received signals having different pulse repetition rates are processed.

10. The system of claim 9 wherein said programmable filter is a digital filter; and said means for programming includes means for applying different preselected sets of weighting coefficients to said digital filter during intervals received signals having different pulse repetition rates are processed.

11. A moving target detector system comprising:
    means for alternately transmitting groups of energy pulses at first and second pulse repetition rates during first and second pulse repetition frequency modes, respectively;
    means for receiving energy refelcted from objects and for producing received signals indicative thereof;
    a programmable filter;
    means for applying said received signals to said programmable filter;
    programming means, synchronized by said transmitting means, for programming said filter to have a first preselected response characteristic during said first modes, and a second preselected response characteristic during said second modes; such that received signals for objects moving slower than a preselected speed are processed with substantially the same transfer function during both modes, and received signals for objects moving faster than a preselected speed are processed with different transfer functions during said two modes; and
    means for monitoring the output signals from said filter and for sensing variations in said output signals, for the same object, between said first and second modes.

12. The system of claim 11 wherein said programmable filter comprises a digital filter; and said programming means includes means for applying first and second preselected sets of weighting coefficients to said digital filter during said first and second modes, respectively.

13. The system of claim 11 wherein said means for monitoring includes means for integrating the output signals for the same object during said first modes and for producing first integrated output signals indicative thereof, means for integrating the output signals for the same objects during said second modes and for producing second integrated output signals indicative thereof, and means for sensing variations in said first and second integrated output signals for each of said objects.

14. The system of claim 13 wherein said means for monitoring includes means for providing a target signal if said sensed variations exceed a threshold level.

15. The system of claim 14 wherein said means for monitoring further comprises means for adapting said threshold level as a function of said integrated output signals.

16. A moving target detector system comprising:
means for alternately transmitting groups of energy pulses at first and second pulse repetition rates during first and second pulse repetition frequency modes, respectively;
means for receiving energy reflected from objects and for producing received signals indicative thereof;
filter means for processing said received signals and producing output signals as a function of said received signals and of a preselected filter response characteristic; and
means for monitoring the output from said filter means and for sensing variations in said output signals, for the same object, between said first and second modes, said means for monitoring includes means for integrating the output signals for the same object during said first modes and for producing first integrated output signals indicative thereof, means for integrating the output signals for the same objects during said second modes and for producing second integrated output signals indicative thereof, and means for sensing variations in said first and second integrated output signals for each of said objects; whereby the presence of the said variations is indicative of an object moving faster than a preselected speed.

* * * * *